United States Patent
Chen et al.

(10) Patent No.: US 9,936,217 B2
(45) Date of Patent: Apr. 3, 2018

(54) METHOD AND ENCODER FOR VIDEO ENCODING OF A SEQUENCE OF FRAMES

(71) Applicant: AXIS AB, Lund (SE)

(72) Inventors: Jiandan Chen, Lund (SE); Markus Skans, Staffanstorp (SE); Willie Betschart, Staffanstorp (SE); Mikael Pendse, Lund (SE); Alexandre Martins, Malmö (SE)

(73) Assignee: AXIS AB, Lund (SE)

( * ) Notice: Subject to any disclaimer, the term of this patent is extended or adjusted under 35 U.S.C. 154(b) by 128 days.

(21) Appl. No.: 14/952,051

(22) Filed: Nov. 25, 2015

(65) Prior Publication Data
US 2016/0165257 A1    Jun. 9, 2016

(30) Foreign Application Priority Data
Dec. 3, 2014 (EP) .................................... 14196126

(51) Int. Cl.
*H04N 19/503* (2014.01)
*H04N 19/119* (2014.01)
(Continued)

(52) U.S. Cl.
CPC ......... *H04N 19/503* (2014.11); *H04N 19/119* (2014.11); *H04N 19/124* (2014.11);
(Continued)

(58) Field of Classification Search
CPC .. H04N 19/503; H04N 19/119; H04N 19/124; H04N 19/137; H04N 19/167;
(Continued)

(56) References Cited

U.S. PATENT DOCUMENTS

| 6,665,342 B1 * | 12/2003 | Brown ............. G08B 13/19602 |
| | | 348/E5.054 |
| 7,277,484 B2 | 10/2007 | Kim et al. |

(Continued)

FOREIGN PATENT DOCUMENTS

| CN | 102682454 A | 9/2012 |
| JP | 2006101075 A | 4/2006 |

(Continued)

OTHER PUBLICATIONS

Benierbah, Said et al. "A New Technique for Quality Scalable Video Coding With H.264", IEEE Transactions on Circuits and Systems for Video Technology, vol. 15, No. 11, pp. 1332-1340 (Nov. 2005).

(Continued)

*Primary Examiner* — Christopher Findley
(74) *Attorney, Agent, or Firm* — Volpe and Koenig, P.C.

(57) ABSTRACT

A method and encoder for video encoding a sequence of frames is provided. The method comprises: receiving a sequence of frames depicting a moving object, predicting a movement of the moving object in the sequence of frames between a first time point and a second time point; defining, on basis of the predicted movement of the moving object, a region of interest (ROI) in the frames which covers the moving object during its entire predicted movement between the first time point and the second time point; and encoding a first frame, corresponding to the first time point, in the ROI and one or more intermediate frames, corresponding to time points being intermediate to the first and the second time point, in at least a subset of the ROI using a common encoding quality pattern defining which encoding quality to use in which portion of the ROI.

20 Claims, 3 Drawing Sheets

(51) Int. Cl.
 *H04N 19/61* (2014.01)
 *H04N 19/124* (2014.01)
 *H04N 19/137* (2014.01)
 *H04N 19/177* (2014.01)
 *H04N 19/17* (2014.01)
 *H04N 19/167* (2014.01)
 *H04N 19/85* (2014.01)
 *H04N 19/172* (2014.01)

(52) U.S. Cl.
 CPC ......... *H04N 19/137* (2014.11); *H04N 19/167* (2014.11); *H04N 19/17* (2014.11); *H04N 19/172* (2014.11); *H04N 19/177* (2014.11); *H04N 19/61* (2014.11); *H04N 19/85* (2014.11)

(58) Field of Classification Search
 CPC .... H04N 19/17; H04N 19/172; H04N 19/177; H04N 19/61; H04N 19/85
 See application file for complete search history.

(56) References Cited

U.S. PATENT DOCUMENTS

| | | | |
|---|---|---|---|
| 8,150,173 | B2 | 4/2012 | Okada et al. |
| 8,693,537 | B2 | 4/2014 | Wang et al. |
| 2007/0230658 | A1 | 10/2007 | Okada et al. |
| 2009/0022403 | A1* | 1/2009 | Takamori ............. H04N 19/139 382/195 |
| 2009/0263021 | A1* | 10/2009 | Takamori ........... G06K 9/00771 382/181 |
| 2012/0314064 | A1* | 12/2012 | Liu .................... G06K 9/00771 348/143 |

FOREIGN PATENT DOCUMENTS

| | | |
|---|---|---|
| JP | 2009253581 A | 10/2009 |
| JP | 2010-193441 A | 9/2010 |
| JP | 2013187769 A | 9/2013 |
| TW | 2010-44882 A1 | 12/2010 |
| WO | 2007024351 A2 | 3/2007 |
| WO | 2014094216 A1 | 6/2014 |

OTHER PUBLICATIONS

Cheng, Po-Yuen et al. "Feature-Preserving Wavelet Scheme for Low Bit Rate Coding", SPIE vol. 2419, XP-000933493, pp. 385-396 (Jan. 1, 1995).

Sabirin, Houari et al. "Graph-Based Object Detection and Tracking in H.264/AVC Bitstreams for Surveillance Video", IEEE, 6 pages (2011).

TW Office Action, Jul. 13, 2017, 3 pages.

* cited by examiner

METHOD AND ENCODER FOR VIDEO ENCODING OF A SEQUENCE OF FRAMES

CROSS REFERENCE TO RELATED APPLICATION

This application claims the benefit of European Patent Application No 14196126.8 filed on Dec. 3, 2014, which is incorporated by reference as if fully set forth.

FIELD OF INVENTION

The present invention relates to the field of video encoding. In particular, it relates to a method and an encoder for encoding a sequence of frames.

BACKGROUND

Known video encoding methods, such as video encoding under the H.264 or more generally H.26x standard, allow for modification of compression levels locally in regions of a video frame. For example, image quality can be improved by adjusting the compression level for a region of interest (ROI) representing an object. This may also be applied to video sequences in which there are moving objects.

This is the topic of U.S. Pat. No. 8,150,173 B2 which, for example, teaches that for video sequences with moving objects, one ROI may be defined per frame. Alternatively, a starting position and size of a ROI may be specified and the specified ROI may then track the motion of the object in the video sequence.

For the purpose of reducing compression artefacts on or around the object of interest, a ROI usually includes not only the object of interest, but also a part of the background. This part of the background varies in every frame when the object is moving. As a result, the compression level used to encode a specific part of the background is varied when an object passes by, sometimes several times if the object is moving in a swaying manner. This will significantly increase the bitrate needed to encode the video sequence since the specific part of the background needs to be re-encoded with different compression levels multiple times. There is hence a need for improvements.

SUMMARY

In view of the above, it is thus an object of the present invention to overcome or at least mitigate the problems discussed above. In particular, it is an object to provide an encoding method and an encoder which reduces the need for re-encoding the background several times as an object passes by.

According to a first aspect of the invention, the above object is achieved by a method for video encoding a sequence of frames, which comprises receiving a sequence of frames depicting a moving object, the sequence comprising a first frame corresponding to a first time point, a second frame corresponding to a second, later, time point, and one or more intermediate frames corresponding to one or more time points being intermediate to the first and the second time point; predicting a movement of the moving object in the sequence of frames between the first time point and the second time point; defining, on basis of the predicted movement of the moving object, a region of interest in the frames which covers the moving object during its entire predicted movement between the first time point and the second time point; and encoding the first frame in the region of interest and the one or more intermediate frames in at least a subset of the region of interest using a common encoding quality pattern defining which encoding quality to use in which portion of the region of interest, wherein, for a particular intermediate frame, the subset of the region of interest covers the object during its entire predicted movement between the time point corresponding to the particular intermediate image frame and the second time point.

With the above method, a movement of the object is predicted and used to define a single ROI which is used when encoding each of the first frame and the one or more intermediate frames. As opposed to the prior art, the ROI does hence not vary between frames.

The ROI is defined to cover the moving object during its entire predicted movement between the first time point and the second time point. In other words, the defined ROI is expected to cover the object in the first frame and the one or more intermediate frames. The moving object, and background pixels in the vicinity of the moving object, is hence expected to be found within the ROI in the first frame as well as in the one or more intermediate frames.

When encoding the first frame and the one or more intermediate frames, a common (that is the same) encoding quality pattern is used with respect to the ROI, or at least with respect to a subset thereof. This means that for a specific part of the background falling within the ROI, the same encoding quality will be used all the time, or at most be changed one time as the object passes by, thereby reducing the need for re-encoding.

For example, in case the common encoding quality pattern is used with respect to the whole ROI for the first frame as well as for each of the one or more intermediate frames, no re-encoding of the background part of the ROI is required. According to other examples, the common encoding quality pattern is applied to a subset of the ROI when encoding the one or more intermediate frames. For a particular intermediate frame, the subset may in such situation cover the object during its predicted remaining movement until the second time point, i.e., the subset is expected to cover the object in the particular intermediate frame and each subsequent intermediate frame until the second time point. In such a case, a specific part of the background needs to be re-encoded at most one time as the object passes by.

As used herein, a sequence of frames refers to a sequence of image frames. It is to be noted that the sequence of frames typically are received sequentially, e.g. as they are captured by a camera.

As used herein, the prediction of a movement of the moving object generally refers to prediction of a movement on basis of frames which have been received so far. Typically, this includes frames corresponding to time points which are previous to the first time point. It may also include the first frame. However, at the time the prediction is carried out, the one or more intermediate frames have typically not yet been received. By starting the prediction of the movement prior to receipt of the one or more intermediate frames, latencies in the encoding process may be reduced.

As used herein the time interval defined by the wording "between the first time point and the second time point" includes the first time point and the time points corresponding to the one or more intermediate frames. However, it does not necessarily include the second time point. With this definition, the defined ROI which covers the moving object during its entire predicted movement between the first time point and the second time point is thus expected to cover the object in the first frame and each of the one or more intermediate frames, but not necessarily in the second frame.

Similarly the subset of the region of interest which covers the object during its entire predicted movement between a time point corresponding to a particular intermediate image frame and the second time point, is a subset which is expected to cover the object in the particular frame and each subsequent intermediate frame, but not necessarily in the second frame.

By a region of interest is generally meant a number of pixels which are judged to be of particular importance, e.g. since they represent an object. In encoding applications, a frame may be divided into macro blocks, e.g. having a fixed size of 16×16 pixels. A region of interest may be composed of a set of such macro blocks which are found to be of particular importance, e.g. since they represent an object.

As used herein an encoding quality pattern typically refers to a spatial pattern or function of encoding qualities. In particular, an encoding quality pattern defines which encoding quality to be used in which portion of the region of interest.

In some embodiments, the encoding quality is set to be constant throughout the ROI. In other words, the encoding quality pattern may define a single encoding quality to be used in the entire region of interest. Having less variation in the encoding quality is advantageous in that it enables prediction of more coding blocks from others, thereby increasing the coding efficiency.

In other embodiments, the encoding quality pattern may define different encoding qualities to be used in different portions of the region of interest. This allows for a greater flexibility. For example, the encoding quality may be set to be lower in portions of the ROI which correspond to parts of the frames which are expected to generally be of lower image quality, such as peripheral parts of the frames.

An encoding quality may generally correspond to a level of compression. A low level of compression typically gives a high encoding quality and vice versa. In some codecs, such as the H.264 codec, the compression level is given in terms of a quantization parameter (QP value). The encoding quality may thus also correspond to a quantization parameter.

As will be further discussed in later sections, some video compression standards, such as the H-264 standard, prescribe temporal video compression implemented in terms of intra frames, e.g. I-frames, and inter frames, e.g. P-frames or B-frames. An intra-frame is basically an image frame that is encoded using only the information in the image frame to be encoded. Moreover, the intra-frame is calculated from all image data captured for the image frame to be encoded. The inter-frames, also referred to as predictive frames or as differential frames, are based on information from previously encoded image frames as well as the information of the presently encoded frame, i.e. the inter-frame may be described as taking advantage of temporally redundant information in previous image frames.

According to embodiments, the first frame may be encoded as an intra frame. Further, the one or more intermediate frames may be encoded as inter-frames. Typically a background pixel does not significantly change between frames. By encoding the intermediate frames as inter-frames, the background pixels therefore typically do not need to be re-encoded for each frame, in particular not as long the encoding quality pattern remains constant over time for the specific background pixels.

In some embodiments, at least some of the one or more intermediate frames are encoded in the whole region of interest (and not just a subset thereof) using the common encoding quality pattern. This includes the case where each of the one or more intermediate frames is encoded in the whole region of interest using the common encoding quality pattern. This is advantageous in that re-encoding of background falling within the region of interest may be avoided altogether.

Generally, a frame is encoded with a higher encoding quality inside of the ROI in comparison to the remainder of the frame, at least in comparison to a surrounding of the ROI. However, encoding at a higher encoding quality comes at the cost of an increased bitrate. This is particular true if the ROI is a large region. From that perspective it is thus good to keep the ROI as small as possible for each frame to be encoded. However, from the perspective of saving bitrate by avoiding re-encoding the background as an object passes by it is good to have an ROI which covers the object during its entire movement between the first and second time point and encode each frame in the whole ROI using the common encoding quality pattern as set out above. There is thus a trade-off to be taken into consideration.

In some embodiments, this trade-off is taken into consideration by encoding the one or more intermediate frames in a subset of the ROI (not the whole ROI) using the common encoding quality pattern. This may be achieved by a shrinking procedure where for each intermediate frame to be encoded a successively smaller subset of the ROI is encoded using the common encoding quality pattern. The subsets may be determined by removing a portion of the ROI corresponding to those parts of the ROI that the object already has passed. In particular, this may be carried out according to an iterative procedure where, for each intermediate frame, a portion of the ROI or subset thereof used when encoding the preceding frame is removed. Differently stated, for a first intermediate frame, the subset of the region of interest may be determined by removing a portion from the region of interest, and for each intermediate frame subsequent to the first intermediate frame, the subset of the region of interest is determined by removing a portion from the subset used when encoding the preceding intermediate frame.

With this procedure, the intermediate frames are encoded using the common encoding quality pattern (which presumably is quite bit consuming) in a successively smaller subset of the ROI, thereby reducing the consumed bitrate. At the same time, the resulting subsets are such that they cover the object's remaining predicted movement. This has as a consequence that the background in the ROI needs to be re-encoded at most one time. The re-encoding of a specific portion of the background typically occurs when the object has passed by and the specific portion of the background forms part of a portion being removed from the ROI.

The portion removed from the region of interest may correspond to a region which covers at least part of the object in the first frame but not in the first intermediate frame, and the portion removed from the subset used when encoding the preceding intermediate frame may correspond to a region which at least partly covers the object in the preceding intermediate frame but not in the subsequent intermediate frame. In this way, one may achieve that for a particular intermediate frame, the subset of the region of interest covers the object during its entire predicted movement between the time point corresponding to the particular intermediate image frame and the second time point.

For each of the one or more intermediate frames, the intermediate frame may, in the removed portion, be encoded with an encoding quality which is lower than the encoding quality defined by the encoding quality pattern for the removed portion. In this way, the resulting total bitrate may be reduced.

The ROI may generally take any shape depending on the predicted movement of the object. For example, it may include a rectangle, wherein a first dimension of the rectangle covers the predicted movement of the moving object between the first time point and the second time point along a first direction in the frames, and the other dimension of the rectangle covers the predicted movement of the moving object between the first time point and the second time point along a second direction being perpendicular to the first direction in the frames. This is advantageous in that it provides for a simple implementation at the same time as account is taken for the object's movement in two dimensions.

By "first dimension" of the rectangle is generally meant a first side of the rectangle and by "the other dimension" is generally meant another side of the rectangle being perpendicular to the first side.

The above disclosed method may be carried out in an iterative manner, meaning that it may be repeated once the second frame is to be encoded. In more detail, the method may further comprise: predicting a movement of the moving object in the sequence of frames between the second time point and a third time point which is later than the second time point; defining, on basis of the predicted movement of the moving object, a further region of interest to cover the moving object during its entire predicted movement between the second time point and the third time point; and using the further region of interest when encoding the second frame. The second frame is typically encoded as an intra frame.

It may happen that the object as observed in the intermediate frames is not covered by the ROI, e.g. due to an error in the prediction of the object movement. For that purpose, the method may further comprise: for at least one intermediate frame, checking whether the moving object as depicted in the at least one intermediate frame is covered by the region of interest, and if not predicting a movement of the moving object in the sequence of frames between a time point corresponding to the at least one intermediate frame and a fourth, later, time point; re-defining, on basis of the predicted movement of the moving object, the region of interest in the frames of the sequence to cover the moving object during its entire predicted movement between the time point corresponding to the at least one of the one or more intermediate frames and the fourth time point; and using the re-defined region of interest when encoding the at least one intermediate frame.

With this arrangement, the ROI is thus re-defined such that it covers the object again starting from a certain intermediate frame until the fourth time point. In this way an error in the prediction of the object movement may be compensated for. The re-defined ROI may be used when encoding the frames which are subsequent to the certain intermediate frame. In this way errors in the prediction of the object movement may be compensated for.

According to a second aspect of the invention, the above object is achieved by a computer program product comprising a computer-readable medium with computer code instructions adapted to carry out the method of the first aspect when executed by a device having processing capability.

According to a third aspect, the above object is achieved by an encoder for video encoding a sequence of frames, which comprises: a receiver configured to receive a sequence of frames depicting a moving object, the sequence comprising a first frame corresponding to a first time point, a second frame corresponding to a second, later, time point, and one or more intermediate frames corresponding to one or more time points being intermediate to the first and the second time point; a predicting component configured to predict a movement of the moving object in the sequence of frames between the first time point and the second time point; a region of interest defining component configured to define, on basis of the predicted movement of the moving object, a region of interest in the frames which covers the moving object during its entire predicted movement between the first time point and the second time point; and an encoding component configured to: encode the first frame in the region of interest and the one or more intermediate frames in at least a subset of the region or interest using a common encoding quality pattern defining which encoding quality to use in which portion of the region of interest, wherein, for a particular intermediate frame, the subset of the region of interest covers the object during its entire predicted movement between the time point corresponding to the particular intermediate frame and the second time point.

The second and third aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF THE PREFERRED EMBODIMENTS

The present invention will now be described more fully hereinafter with reference to the accompanying drawings, in which embodiments of the invention are shown. The systems and devices disclosed herein will be described during operation.

Figure 1:
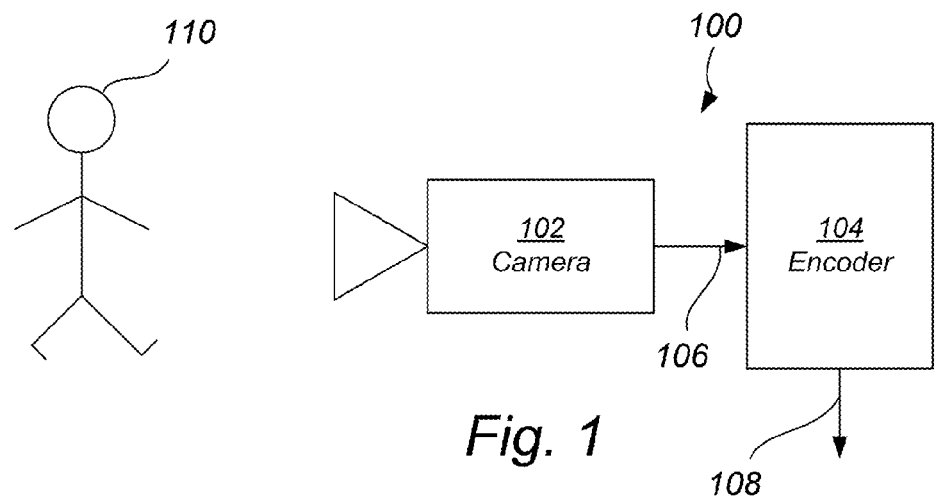
FIG. 1 schematically illustrates an encoding system according to embodiments.

FIG. 1 illustrates an encoding system 100 comprising a video camera 102 operatively connected to a video encoder 104. The video camera 102 may for example be arranged to capture a video sequence of frames 106 which depicts a moving object 110, here illustrated by a person. The video sequence of frames 106 may be sent to the encoder 104 which is arranged to encode the sequence of frames 106. The encoder 104 may output an encoded sequence of frames 108 in the form of a bit stream.

It is to be understood that the encoder 104 may form a unit which is physically separate from the video camera 102, or it may be included in the camera 102.

Figure 2:
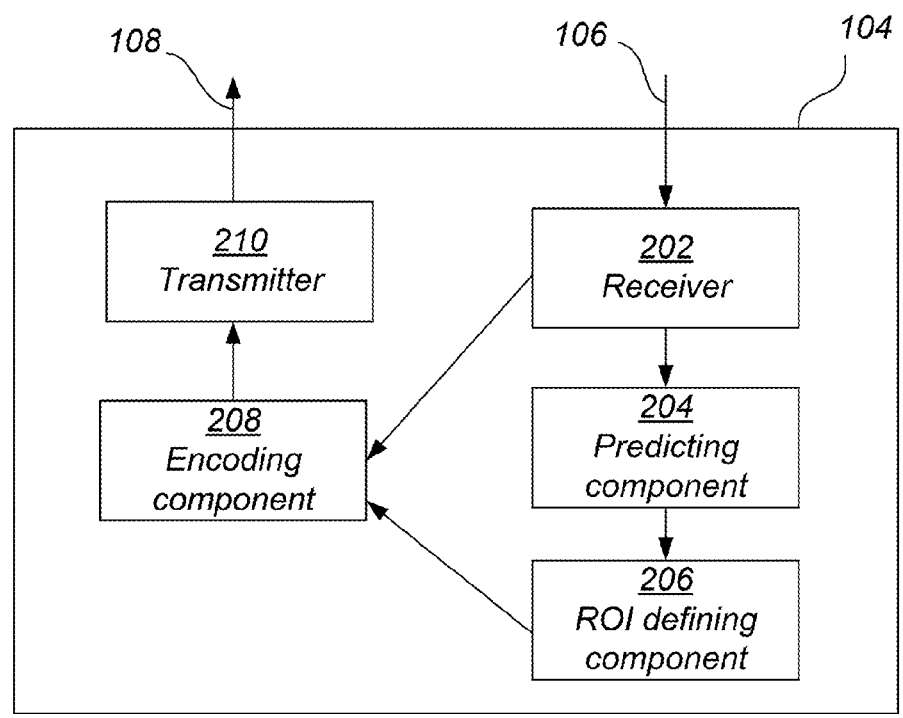
FIG. 2 illustrates an encoder of the encoding system of FIG. 1 in more detail.

FIG. 2 illustrates the encoder 104 in more detail. The encoder 104 comprises a receiver 202, a predicting component 204, a region of interest defining component 206, an encoding component 208, and a transmitter 210.

The receiver 202 is arranged to receive a sequence of frames 106 from the video camera 102. The receiver 202 may forward the sequence of frames to the encoding component 208 and the predicting component 204. The predicting component 204 and the encoding component 208 may be configured to process the received sequence of frames at least partly in parallel.

As will be described in more detail below, the predicting component 204 is arranged to predict a movement of the object 110 in the sequence of frames 106. The predicted movement then forms the basis for the ROI defining component 206 when determining a ROI to be used by the encoding component 208 when encoding the received sequence of frames 106. The transmitter 210 is arranged to transmit the resulting encoded video sequence of frames 108 to an external entity, e.g. via a network.

It is to be understood that the components 202, 204, 206, 208, 210 described with respect to FIG. 2 represent functional blocks of the encoder 104. These functional blocks may be implemented by means of hardware or software or a combination thereof. For example, the encoder 104 may include circuitry configured to implement the functionality of the components 202, 204, 206, 208, 210. Alternatively, or additionally, the encoder 104 may include a processor which in association with a (non-transitory) computer-readable medium or device is configured to implement the functionality of the components 202, 204, 206, 208, 210. For this purpose, the computer-readable medium may be arranged to store computer code instructions which, when executed by the processor, implement any method disclosed herein.

Figure 3:
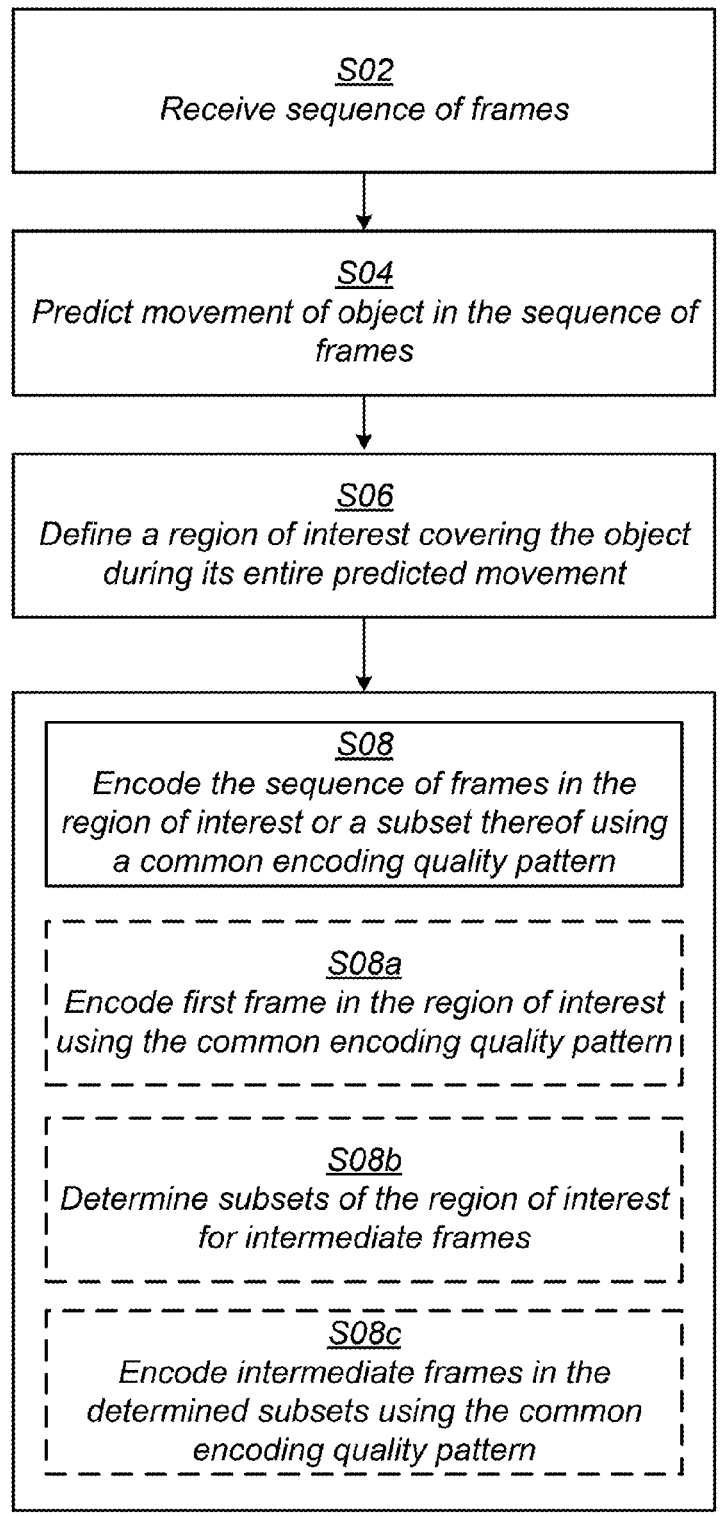
FIG. 3 is a flow chart of a method for video encoding of a sequence of frames according to embodiments.

The operation of the encoder 104 will now be explained with reference to FIGS. 1, 2, 4 and the flow chart of FIG. 3.

In step S02 the receiver 202 receives a sequence of frames 106 captured by the video camera 102, to be encoded. The receiver 202 typically receives the sequence of frames 106 in a sequential manner, and in real time. In other words, the receiver 202 receives frames as they are captured by the camera 102.

The sequence of frames 106 is assumed to depict a moving object, such as the moving object 110 in FIG. 1. The sequence of frames 106, or at least a sub-sequence thereof, is further illustrated in FIG. 4.

Each frame in the sequence 106 corresponds to a time point. In particular, the sequence of frames 106 comprises a first frame 402 corresponding to a first time point $t_1$, a second frame 412 corresponding to a second, later, time point $t_2$, and one or more intermediate frames 404, 406, 408, 410, here illustrated by four frames, corresponding to time points between the first time point $t_1$ and the second time point $t_2$. It is to be understood that the number of intermediate frames 404, 406, 408, 410 may vary.

In video encoding, it is known to encode some frames as intra-frames (in some video encoding schemes referred to as I-frames), meaning that the frame is, at least essentially, fully encoded, and to encode some frames as inter-frames (in some encoding schemes referred to as P- or B-frames), meaning that the frame is encoded in relation to a previous frame. Typically, an intra-frame is followed by a plurality of inter-frames. In the example of FIG. 4, the first and the second time point typically correspond to two subsequent intra-frames, i.e., the first and the second frames will be encoded as intra-frames. Moreover, the intermediate frames will typically be encoded as inter-frames.

The frames 402-412 depict a moving object 414. In the illustrated example, the object 414 moves in an essentially downwards direction (as illustrated by the arrow), although in a swaying manner, meaning that object 414 has a tendency to move back and forth.

In step S04, the predicting component 204 predicts a movement of the moving object. In more detail, the predicting component 204 predicts a movement of the object 414 in the sequence of frames from the first time point $t_1$ until the second time point. As mentioned above, the frames are typically received in a sequential manner. The prediction is therefore based on the frames which have been received so far. This may typically include frames corresponding to time points which are previous or equal to the first time point. For example, when step S04 is carried out, the predicting component 204 may not yet have received the intermediate frames 404-410, or even the first frame 402. By predicting the motion of the object 414 from the first time point until the second time point, instead of awaiting the receipt of the frames 402-410 corresponding to time points from the first time point until the second time point, latencies in the encoding process may be reduced.

The predicting component 204 may predict the movement of the moving object 414 in any known manner, e.g. by using motion vectors. This may include predicting a path that the moving object 414 is expected to move along between the first time point $t_1$ and the second time point $t_2$. In some embodiments, the predicting component 204 may predict the movement by predicting a velocity v of the moving object and a direction in which the moving object 414 is expected to move between the first time point $t_1$ and the second time point $t_2$. In other embodiments, the predicting component 204 may apply a more complicated model of the path such that the predicted path of the object 414 between the first time point $t_1$ and the second time point $t_2$ essentially may take any form. The predicting component 204 may also predict the movement of the object 414 along several dimensions or directions in the frame. For example, the prediction component 204 may predict the movement of the object 414 in a first direction in the frames and a second direction in the frames being perpendicular to the first direction. The first direction may for instance correspond to the main direction in which the object 414 moves. In FIG. 4 this would correspond to the downwards direction. However, it may be the case that the object 414 does not move straight along the first, main, direction, but may move in a swaying manner, such as along the left-right direction of FIG. 4. To take this into account, the prediction component 204 may therefore also predict the (swaying) movement of the object 114 along a second direction, which may be perpendicular to the first direction. In FIG. 4 this would correspond to the left-right direction of the illustrated frames.

More generally, in case the predicting component 204 predicts the movement of the object 414 in terms of a path that the object 414 is expected to follow between the first time point $t_1$ and the second time point $t_2$, the predicting component 204 may also predict the object's 414 swaying motion about, e.g. perpendicularly, to the path, so as to take the swaying behaviour of the object 414 as it moves into account.

In step S06, the ROI defining component 206 defines a ROI 416 on basis of the predicted movement from the predicting component 204. The ROI 416 is defined such that it covers the moving object 414 during its entire predicted movement between the first time point $t_1$ and the second time point $t_2$. By covering the moving object 414 during its entire predicted movement between the first time point $t_1$ and the second time point $t_2$ is particularly meant that the ROI 416 is defined such that it is expected to cover, i.e. include, the moving object in the first frame 402 and each of the intermediate frames 404-410 (but not necessarily in the second frame 412. A new ROI 418 will typically be defined with respect to the second frame 412 as further discussed below.). Notably, the ROI 416 is a single region defined with respect to the first frame 402 and the intermediate frames 404-410 to be used later on when encoding the first frame 402 and the intermediate frames 404-410. This is opposed to prior art which teaches to use different ROIs for each frame.

The ROI may generally have any shape depending on the predicted movement of the object 414. For example, in case the movement of the object 414 has been predicted in terms of a path (of general shape) that the object 414 is expected to follow, the ROI may take a form which follows the shape of that path, albeit at each point extending in a direction perpendicular to the path so as to cover the object in view of its swaying movement.

Figure 4:
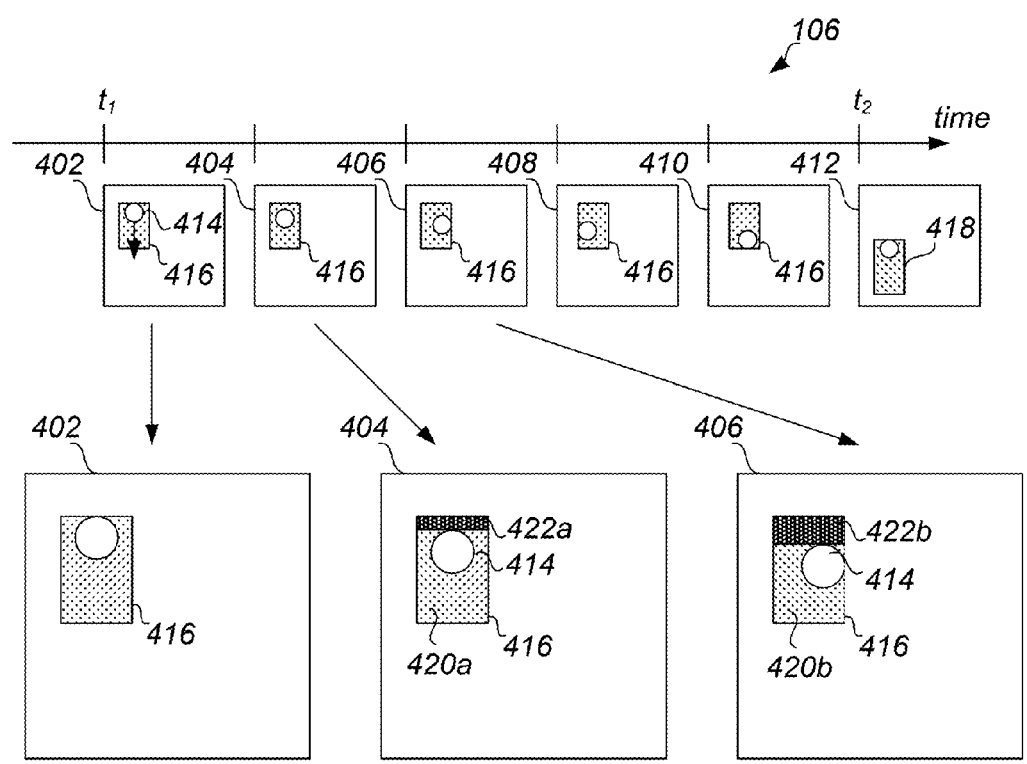
FIG. 4 schematically illustrates a sequence of frames depicting a moving object.

In some embodiments, the ROI 416 includes, or has the shape of, a rectangle, as further illustrated in FIG. 4. In particular, a first dimension of the rectangle may be defined to cover the object 414 during its predicted movement along a first direction in the frames (such as the downwards direction in FIG. 4), and a second dimension of the rectangle may be defined to cover the objects 414 during its predicted movement along a second direction in the frames (such as the left-right direction in FIG. 4).

In case the movement along the object's main direction of movement is predicted in terms of a velocity v (which possibly is time dependent), the area of the ROI may be calculated as $$A_{ROI} = w \int_{t_1}^{t_2} v \cdot dt,$$

where w is a range of the predicted movement of the object 414 between time points $t_1$ and $t_2$ in a direction perpendicular to the main predicted path. However, it is to be understood that the ROI 416 is always set to at least have an area which covers the size of the object. For example, in case the velocity is predicted to be equal to zero (meaning that the object is predicted not to move), the ROI 416 is still set to a region which covers the object in the first frame 402 (and thus also in the intermediate frames 404-410).

In step S08, the encoding component 208 encodes the first frame 402 and the one or more intermediate frames 404-410. For this purpose, the encoding component 208 may include a codec implementing any known standard allowing the encoding quality, i.e. level of compression, to be set for a region of interest. This includes the standards in the H.26x family, including the H.264 standard. The level of compression defined by the H.264 codec is often referred to as a quantization parameter (QP).

Such video compression standards prescribe temporal video compression implemented in terms of intra frames, e.g. I-frames, and inter frames, e.g. P-frames or B-frames. An intra-frame is basically an image frame that is encoded using only the information in the image frame to be encoded. Moreover the intra-frame is calculated from all image data captured for the image frame to be encoded. Therefore, the intra-frame sometimes is referred to as a full frame. The inter-frames, also referred to as predictive frames or as differential frames, are based on information from previously encoded image frames as well as the information of the presently encoded frame, i.e. the inter-frame may be described as taking advantage of temporally redundant information in previous image frames. The motion video implementing this type of codecs typically generates an intra-frame followed by a predetermined number of inter-frames and then a new intra-frame followed by the same number of inter-frames. The length of this sequence of an intra-frame followed by a number of inter-frames is often referred to as Group of Pictures length (GOP-length).

In the present case, the first frame 402, the intermediate frames 404-410, and the second frame 412 may form a sequence which is encoded as a GOP. Thus, the first frame 402 may be encoded as an intra frame, the intermediate frames 404-410 as inter frames, and the second frame 412 as an intra frame.

Prior to encoding the first frame 402 and the intermediate frames 404-410, the encoding component 208 typically sets an encoding quality pattern to be used in connection to encoding the ROI 416 or subsets thereof. The encoding quality pattern defines which encoding quality, i.e. compression level, to use in which portion of the ROI 416. Typically, the encoding quality pattern is set such that the encoding quality is higher (i.e. a lower compression level is applied) inside the ROI compared to the encoding quality in a surrounding of the ROI. Generally, the encoding quality outside of the ROI 416 may vary spatially and also temporally between frames.

In some embodiments, the encoding quality pattern defines a single encoding quality to be used in the entire ROI 416. In other words, in such embodiments the encoding quality is constant throughout the ROI 416. However, in other embodiments, the encoding quality may be allowed to vary spatially within the ROI 416. The encoding quality pattern may hence define different encoding qualities to be used in different portions of the ROI. For example, the encoding quality pattern may define that the encoding quality is to vary according to a gradient within the ROI 416.

The encoding component 208 sets the encoding quality pattern defined with respect to the ROI 416 to be temporally constant between the first time point $t_1$ and the second time point $t_2$, i.e. the encoding component applies a common encoding quality pattern when encoding the first frame 402 and the intermediate frames 404-410. Typically, however, the encoding quality pattern will be re-set when encoding the second frame 412. By applying the same encoding quality pattern in the ROI 416 when encoding the first frame 402 and the intermediate frames 404-410, re-encoding between frames of the background may advantageously be reduced.

Step S08 may comprise a plurality of sub-steps. In step S08*a*, the encoding component 208 encodes the first frame 402. The first frame 402 is typically encoded as an intra frame. When encoding the first frame 402, the encoding component 208 applies the selected encoding quality pattern in the (whole) ROI 416.

The encoding component 208 then proceeds to encode the intermediate frames 404-410. The intermediate frames 404-410 are typically encoded as inter frames.

According to some embodiments, the encoding component 208 applies the selected encoding quality pattern in the whole ROI 416 when encoding the intermediate frames 404-410.

In other embodiments, the encoding component 208 applies the selected encoding quality pattern in a subset of the ROI 416 when encoding at least some of the intermediate frames 404-410.

In more detail, the method may comprise a sub-step S08*b* in which the encoding component 208, for each intermediate frame 404-410, determines a subset of the ROI 416 to be encoded in accordance with the selected encoding quality pattern. In particular, the encoding component 208 may determine the subset of the ROI for a particular intermediate frame as a subset of the ROI which covers the object 414 during its predicted movement between the time point corresponding to the particular intermediate frame and the second time point $t_2$. This may be thought of as shrinking or removing a portion of the ROI corresponding to those pixels already passed by the object 414.

This is further illustrated in the lower part of FIG. 4, which shows an enlargement of the first frame 402, the first intermediate frame 404, and the second intermediate frame 406. With respect to the first intermediate frame 404, the encoding component 208 has determined a subset 420a of the ROI 416 by removal of a portion 422a corresponding to pixels already passed by the object 414 at the time point corresponding to the first intermediate frame. In particular, the removed portion 422a corresponds to a region which at least partly covers the object 414 in the first frame 402, but not in the first intermediate frame 404.

With respect to the second intermediate frame 406, the encoding component 208 has determined a subset 420b of the ROI 416 by removal of a portion 422b corresponding to pixels already passed by the object 414 at the time point corresponding to the second intermediate frame 406. In particular, the removed portion 422b corresponds to a region which at least partly covers the object 414 in the first frame 402 and the first intermediate frame 404, but not in the second intermediate frame 406.

The encoding component 208 may apply an iterative procedure to determine the subsets 420a, 420b of the ROI 416. More specifically, for the first intermediate frame 404, the subset 420a of the ROI 416 is determined by removing the portion 422a from the ROI 416. For the second intermediate frame 404, the subset 420b of the ROI 416 is determined by removing a portion from the subset 420a determined with respect to the first intermediate 404. More generally, for each intermediate frame 404-410 subsequent to the first intermediate frame 404, the subset of the ROI 416 is determined by removing a portion from the subset determined with respect to the preceding intermediate frame.

Denoting the time point corresponding to the first frame by $t_{1,0}$, the time points corresponding to the intermediate frames by $t_{1,i}$, the area of the ROI by $A_0$ and the area of the subset of the ROI corresponding to the i:th intermediate frame by $A_i$, the area of the subsets may iteratively be calculated as:

$$A_0 = A_{ROI} = w \int_{t_1}^{t_2} v \cdot dt,$$

$$A_i = A_{i-1} - w \int_{t_{1,i-1}}^{t_{1,i}} v \cdot dt.$$

However, as further mentioned above it is to be understood that the ROI 416 is always set to at least have an area which covers the size of the object.

According to some embodiments, the encoding component 208, in sub-step S08c, encodes each of the intermediate frames 404-410 in the determined subsets 420a, 420b using the common encoding quality pattern. In the removed portions 422a, 422b, the encoding component 208 may encode the intermediate frames 402-410 with an encoding quality which is lower (i.e. has a higher compression level) than the encoding quality defined by the encoding quality pattern with respect to the removed portion.

In some cases it may happen that the object 414 moves out of the ROI 416, e.g. since the prediction of the object movement did not coincide with the true object movement. When this happens, the ROI 416 may be redefined, e.g. enlarged, or the method may be re-started again, taking the time point when the object has moved out of the ROI 416 as a new starting point.

In order to discover whether this is the case, the encoding component 208 may, for each frame to be encoded, further check whether the moving object 414 as depicted in the concerned frame is covered by the region of interest. If this is not the case, the predicting component 204 may predict a movement of the object between a time point corresponding to the concerned frame and a later time point (which may or may not coincide with the second time point). The ROI defining component 206 may then, on basis of the newly predicted movement of the object 414 re-define the ROI such that that it covers the object 414 during the predicted movement between the time point corresponding to the concerned frame and the later time point. The encoding component 208 may then use the so re-defined ROI when encoding the concerned frame and any subsequent frame corresponding to a time point before the later time point.

It is to be understood that the method above disclosed method S02-S08 may be repeated over and over again. In particular, the method is repeated upon reaching time $t_2$, i.e. time $t_2$ is taken as a start time point.

It will be appreciated that a person skilled in the art can modify the above-described embodiments in many ways and still use the advantages of the invention as shown in the embodiments above. For example, there may be several moving objects in a sequence of frames. In that case, one ROI may be defined per object. Different encoding quality patterns may be used for different ROIs. Thus, the invention should not be limited to the shown embodiments but should only be defined by the appended claims. Additionally, as the skilled person understands, the shown embodiments may be combined.

What is claimed is:

1. A method for video encoding a sequence of frames, comprising:
    receiving a sequence of frames depicting a moving object, the sequence comprising a first frame corresponding to a first time point, a second frame corresponding to a second, later, time point, and one or more intermediate frames corresponding to one or more time points being intermediate to the first and the second time point;
    predicting a movement of the moving object in the sequence of frames between the first time point and the second time point;
    defining, on basis of the predicted movement of the moving object, a region of interest in the frames which covers the moving object during its entire predicted movement between the first time point and the second time point, wherein the region of interest does not vary between the frames; and
    encoding the first frame in the region of interest and the one or more intermediate frames in at least a subset of the region of interest using a common constant encoding quality pattern defining which encoding quality to use in which portion of the region of interest, wherein, for a particular intermediate frame, the subset of the region of interest covers the object during its entire predicted movement between the time point corresponding to the particular intermediate image frame and the second time point,
    wherein for a first intermediate frame, the subset of the region of interest is determined by removing a portion from the region of interest, and for each intermediate frame subsequent to the first intermediate frame, the subset of the region of interest is determined by removing a portion from the subset used when encoding a preceding intermediate frame.

2. The method of claim 1, wherein the encoding quality pattern defines a single encoding quality to be used in the entire region of interest.

3. The method of claim 1, wherein the encoding quality pattern defines different encoding qualities to be used in different portions of the region of interest.

4. The method of claim 1, wherein each encoding quality corresponds to a level of compression.

5. The method of claim 1, wherein the first frame is encoded as an intra frame.

6. The method of claim 1, wherein the one or more intermediate frames are encoded as inter-frames.

7. The method of claim 1, wherein at least some of the one or more intermediate frames are encoded in the whole region of interest using the common encoding quality pattern.

8. The method of claim 1, wherein
the portion removed from the region of interest corresponds to a region which covers at least part of the object in the first frame but not in the first intermediate frame, and
the portion removed from the subset used when encoding the preceding intermediate frame corresponds to a region which at least partly covers the object in the preceding intermediate frame but not in the subsequent intermediate frame.

9. The method of claim 1, further comprising, for each of the one or more intermediate frames, encoding the intermediate frame in the removed portion with an encoding quality which is lower than the encoding quality defined by the encoding quality pattern for the removed portion.

10. The method of claim 1, wherein the region of interest includes a rectangle, wherein a first dimension of the rectangle covers the predicted movement of the moving object between the first time point and the second time point along a first direction in the frames, and the other dimension of the rectangle covers the predicted movement of the moving object between the first time point and the second time point along a second direction being perpendicular to the first direction in the frames.

11. The method of claim 1, further comprising:
predicting a movement of the moving object in the sequence of frames between the second time point and a third time point which is later than the second time point;
defining, on basis of the predicted movement of the moving object, a further region of interest to cover the moving object during its entire predicted movement between the second time point and the third time point; and
using the further region of interest when encoding the second frame.

12. The method of claim 1, further comprising:
for at least one intermediate frame, checking whether the moving object as depicted in the at least one intermediate frame is covered by the region of interest, and if not
predicting a movement of the moving object in the sequence of frames between a time point corresponding to the at least one intermediate frame and a fourth, later, time point;
defining, on basis of the predicted movement of the moving object, the region of interest in the frames of the sequence to cover the moving object during its entire predicted movement between the time point corresponding to the at least one of the one or more intermediate frames and the fourth time point; and using the re-defined region of interest when encoding the at least one intermediate frame.

13. A computer program product comprising a computer-readable medium with computer code instructions adapted to carry out the method of claim 1 when executed by a device having processing capability.

14. The computer program product of claim 13, wherein the encoding quality pattern defines a single encoding quality to be used in the entire region of interest or different encoding qualities to be used in different portions of the region of interest.

15. The computer program product of claim 13, wherein each encoding quality corresponds to a level of compression.

16. The computer program product of claim 13, wherein at least some of the one or more intermediate frames are encoded in the whole region of interest using the common encoding quality pattern.

17. The computer program product of claim 13, wherein
the portion removed from the region of interest corresponds to a region which covers at least part of the object in the first frame but not in the first intermediate frame, and
the portion removed from the subset used when encoding the preceding intermediate frame corresponds to a region which at least partly covers the object in the preceding intermediate frame but not in the subsequent intermediate frame.

18. The computer program product of claim 13, further comprising, for each of the one or more intermediate frames, encoding the intermediate frame in the removed portion with an encoding quality which is lower than the encoding quality defined by the encoding quality pattern for the removed portion.

19. The computer program product of claim 13, wherein the region of interest includes a rectangle, wherein a first dimension of the rectangle covers the predicted movement of the moving object between the first time point and the second time point along a first direction in the frames, and the other dimension of the rectangle covers the predicted movement of the moving object between the first time point and the second time point along a second direction being perpendicular to the first direction in the frames.

20. An encoder for video encoding a sequence of frames, comprising:
a receiver configured to receive a sequence of frames depicting a moving object, the sequence comprising a first frame corresponding to a first time point, a second frame corresponding to a second, later, time point, and one or more intermediate frames corresponding to one or more time points being intermediate to the first and the second time point;
a predicting component configured to predict a movement of the moving object in the sequence of frames between the first time point and the second time point;
a region of interest defining component configured to define, on basis of the predicted movement of the moving object, a region of interest in the frames which covers the moving object during its entire predicted movement between the first time point and the second time point, wherein the region of interest does not vary between the frames;
an encoding component configured to:
encode the first frame in the region of interest and the one or more intermediate frames in at least a subset of the region or interest using a common constant encoding quality pattern defining which encoding quality to use in which portion of the region of interest, wherein, for a particular intermediate frame, the subset of the region of interest covers the object during its entire predicted movement between the time point corresponding to the particular intermediate frame and the second time point, for a first intermediate frame, determining the subset of the region of interest by removing a portion from the region of interest, and for each intermediate frame subsequent to the first intermediate frame, determining the subset of the region of interest by removing a portion from the subset used when encoding the preceding intermediate frame.

* * * * *